United States Patent
Sawabe et al.

(10) Patent No.: US 11,863,399 B2
(45) Date of Patent: Jan. 2, 2024

(54) SYSTEM, METHOD, AND CONTROL APPARATUS

(71) Applicant: NEC Corporation, Tokyo (JP)

(72) Inventors: Anan Sawabe, Tokyo (JP); Takanori Iwai, Tokyo (JP); Kosei Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/642,341

(22) PCT Filed: Sep. 30, 2019

(86) PCT No.: PCT/JP2019/038457
§ 371 (c)(1),
(2) Date: Mar. 11, 2022

(87) PCT Pub. No.: WO2021/064769
PCT Pub. Date: Apr. 8, 2021

(65) Prior Publication Data
US 2022/0303190 A1    Sep. 22, 2022

(51) Int. Cl.
*H04L 41/16* (2022.01)
*H04L 43/16* (2022.01)
*G06F 18/21* (2023.01)

(52) U.S. Cl.
CPC .......... *H04L 41/16* (2013.01); *G06F 18/2185* (2023.01); *H04L 43/16* (2013.01)

(58) Field of Classification Search
CPC ...................................................... H04L 41/16
See application file for complete search history.

(56) References Cited

U.S. PATENT DOCUMENTS

| | | | |
|---|---|---|---|
| 10,810,512 B1* | 10/2020 | Wubbels | G06N 20/00 |
| 2003/0074338 A1* | 4/2003 | Young | G05B 13/027 706/15 |
| 2010/0309799 A1 | 12/2010 | Nunzi et al. | |
| 2013/0122885 A1 | 5/2013 | Kojima | |
| 2015/0100530 A1* | 4/2015 | Mnih | A63F 13/67 706/25 |
| 2017/0193360 A1* | 7/2017 | Gao | G06N 3/08 |
| 2017/0364831 A1 | 12/2017 | Ghosh et al. | |

(Continued)

FOREIGN PATENT DOCUMENTS

| | | |
|---|---|---|
| JP | H09-223092 A | 8/1997 |
| JP | 2010-539760 A | 12/2010 |

(Continued)

OTHER PUBLICATIONS

International Search Report for PCT Application No. PCT/JP2019/038457, dated Dec. 24, 2019.

(Continued)

*Primary Examiner* — Philip C Lee
(74) *Attorney, Agent, or Firm* — Sughrue Mion, PLLC

(57) ABSTRACT

In order to enable stabilizing control of communication in a communication network, a system according to an aspect of the present disclosure includes: an obtaining means for obtaining work-related information related to human work in network operation; and a training means for training a machine learning based controller for controlling communication in a communication network, based on the work-related information.

15 Claims, 18 Drawing Sheets

(56) References Cited

U.S. PATENT DOCUMENTS

| | | | |
|---|---|---|---|
| 2019/0279081 A1* | 9/2019 | Pham | G06N 3/08 |
| 2019/0306023 A1* | 10/2019 | Vasseur | G06N 5/04 |
| 2020/0177495 A1 | 6/2020 | Inoue et al. | |
| 2020/0351201 A1* | 11/2020 | Li | G06F 11/3006 |
| 2021/0012239 A1* | 1/2021 | Arzani | H04L 43/50 |

FOREIGN PATENT DOCUMENTS

| | | |
|---|---|---|
| JP | 2013-106202 A | 5/2013 |
| JP | 2019-526107 A | 9/2019 |
| WO | 2019/026684 A1 | 2/2019 |

OTHER PUBLICATIONS

English translation of Written opinion for PCT Application No. PCT/JP2019/038457, dated Dec. 24, 2019.
ATA Shingo, "A Framework for Automating Operation and Management with Combination of Traffic and Configuration Histories", IEICE TechnicalReport, vol. 116, No. 405, pp. 75-80.

* cited by examiner

|         | Action A | Action B |
|---------|----------|----------|
| State A | qAA      | qAB      |
| State B | qBA      | qBB      |

Fig. 2

| TIME | PARAMETER | PARAMETER | ... |
|---|---|---|---|
| ... | ... | ... | ... |
| 20xx/xx/xx xx:xx | a | a | ... |
| 20xx/xx/xx xx:xx | a | b | ... |
| ... | ... | ... | ... |

Fig. 6

SYSTEM, METHOD, AND CONTROL APPARATUS

This application is a National Stage Entry of PCT/JP2019/038457 filed on Sep. 30, 2019, the contents of all of which are incorporated herein by reference, in their entirety.

BACKGROUND

Technical Field

The present disclosure relates to a system, a method, and a control apparatus.

Background Art

In a network in which a communication environment changes, automatically configuring a control parameter suitable for the communication environment is extremely important. As a method for automatically configuring the control parameter, machine learning is expected. As a type of the machine learning, reinforcement learning has been known.

For example, PTL 1 describes a technique of using reinforcement learning for automatically configuring a control parameter of a radio communication network.

CITATION LIST

Patent Literature

PTL 1: JP 2013-106202 A

SUMMARY

Technical Problem

However, when reinforcement learning is used in order to automatically configure a control parameter of a communication network, a long period of time may be required for convergence of learning. Thus, control of communication in the communication network may be unstable over such a long period of time in which learning does not converge.

An example object of the present disclosure is to provide a system, a method, and a control apparatus that can stabilize control of communication in a communication network.

Solution to Problem

A system according to an aspect of the present disclosure includes: an obtaining means for obtaining work-related information related to human work in network operation; and a training means for training a machine learning based controller for controlling communication in a communication network, based on the work-related information.

A method according to an aspect of the present disclosure includes: obtaining work-related information related to human work in network operation; and training a machine learning based controller for controlling communication in a communication network, based on the work-related information.

A control apparatus according to an aspect of the present disclosure includes: an obtaining means for obtaining work-related information related to human work in network operation; and a training means for training a machine learning based controller for controlling communication in a communication network, based on the work-related information.

Advantageous Effects of Invention

According to the present disclosure, control of communication in a communication network can be stabilized. Note that, according to the present disclosure, instead of or together with the above effects, other effects may be exerted.

BRIEF DESCRIPTION OF THE DRAWINGS

FIG. 2 is a diagram for illustrating an example of a Q table;

FIG. 6 is a diagram illustrating an example of a work log of a change of a network control parameter according to the first example embodiment;

DESCRIPTION OF THE EXAMPLE EMBODIMENTS

Hereinafter, example embodiments of the present disclosure will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Related Art
2. First Example Embodiment
   2.1. Configuration of System
   2.2. Configuration of Control Apparatus
   2.3. Operation (Training of Machine Learning Based Controller)
   2.4. Example Alterations
3. Second Example Embodiment
   3.1. Configuration of System
   3.2. Configuration of Control Apparatus
   3.3. First Operation (Training of Machine Learning Based Controller)
   3.4. Second Operation (Selection of Controller)
   3.5. Example Alterations
4. Third Example Embodiment

1. Related Art

Figure 1:
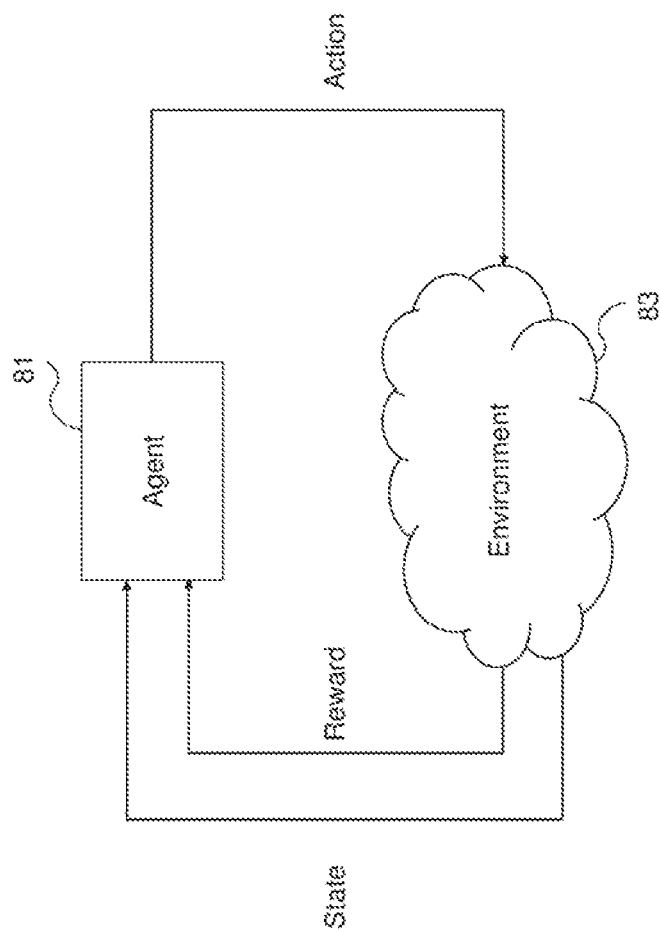
FIG. 1 is a diagram for illustrating an overview of reinforcement learning.

With reference to FIG. 1 and FIG. 2, as techniques related to example embodiments of the present disclosure, supervised learning being a type of machine learning and reinforcement learning being a type of machine learning will be described.

(1) Supervised Learning

In supervised learning, with the use of training data including input data and output data (specifically, correct answer data) corresponding to the input data, what kind of data is to be output is learned in response to the input data. In other words, in supervised learning, with the use of the training data, a pattern of output data for input data is learned.

For supervised learning, for example, algorithm such as a neural network, a support vector machine, or a decision tree is used.

(2) Reinforcement Learning

FIG. 1 is a diagram for illustrating an overview of reinforcement learning. With reference to FIG. 1, in reinforcement learning, an agent 81 observes a state of an environment 83, and selects an action from the observe state. The agent 81 obtains a reward from the environment 83 through selection of the action under the environment. Through repetition of such a series of operations, the agent 81 can learn what kind of action brings out the greatest reward according to the state of the environment 83. In other words, the agent 81 can learn an action to be selected according to the environment in order to maximize the reward.

An example of reinforcement learning is Q learning. In Q learning, for example, a Q table is used, which indicates how high value each action has regarding each state of the environment 83. The agent 81 selects an action according to a state of the environment 83 by using the Q table. In addition, the agent 81 updates the Q table, based on the reward obtained according to selection of the action.

FIG. 2 is a diagram for illustrating an example of the Q table. With reference to FIG. 2, the states of the environment 83 include state A and state B, and the actions of the agent 81 include action A and action B. The Q table indicates value when each action is taken in each state. For example, the value of taking action A in state A is $q_{AA}$, and the value of taking action B in state A is $q_{AB}$. The value of taking action A in state B is $q_{BA}$, and the value of taking action B in state B is $q_{BB}$. For example, the agent 81 takes an action having the highest value in each state. As an example, when $q_{AA}$ is higher than $q_{AB}$, the agent 81 takes action A in state A. Note that the value ($q_{AA}$, $q_{AB}$, $q_{BA}$, and $q_{BB}$) in the Q table is updated based on the reward obtained according to selection of the action.

In reinforcement learning, taking an action having the highest value in each state described above is referred to as "exploitation (use)". When learning is performed only by "exploitation", learning results may be a local optimal solution instead of an optimal solution because the action that can be taken in each state is limited. Thus, in reinforcement learning, learning is performed by "exploitation" and "exploration (search)". "Exploration" means that an action randomly selected in each state is taken. For example, in the Epsilon-Greedy method, "exploration" is selected with probability E, and "exploitation" is selected with probability 1−ε. With "exploration", for example, in a certain state, an action with unknown value is selected, and as a result, value of the action in the certain state can be known. Owing to such "exploration", it is more likely that an optimal solution may be obtained as the learning results.

2. First Example Embodiment

With reference to FIG. 3 to FIG. 12, a first example embodiment of the present disclosure will be described.

2.1. Configuration of System

Figure 3:
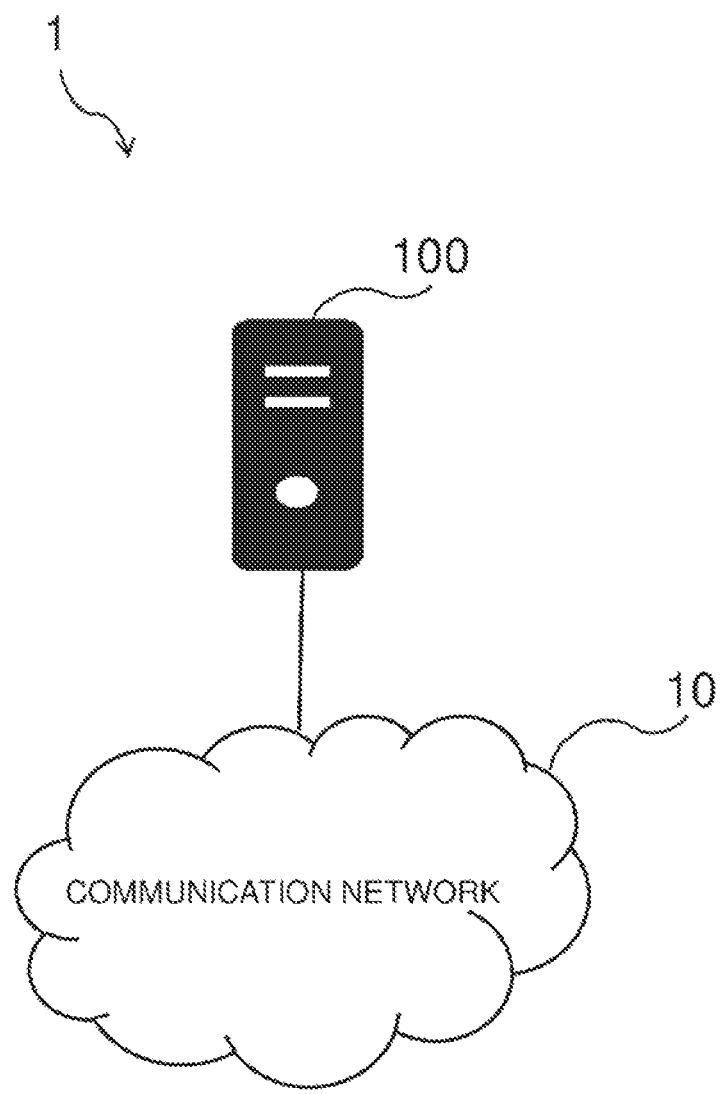
FIG. 3 is a diagram illustrating an example of a schematic configuration of a system according to a first example embodiment.

FIG. 3 illustrates an example of a schematic configuration of a system 1 according to the first example embodiment. With reference to FIG. 3, the system 1 includes a communication network 10 and a control apparatus 100.

(1) Communication Network 10

The communication network 10 transfers data. For example, the communication network 10 includes network devices (for example, a proxy server, a gateway, a router, a switch, and/or the like) and a line, and each of the network devices transfers data via the line.

The communication network 10 may be a wired network, or may be a radio network. Alternatively, the communication network 10 may include both of a wired network and a radio network. For example, the radio network may be a mobile communication network using the standard of a communication line such as Long Term Evolution (LTE) or 5th Generation (5G), or may be a network used in a specific area such as a wireless local area network (LAN) or a local 5G. The wired network may be, for example, a LAN, a wide area network (WAN), the Internet, or the like.

(2) Control Apparatus 100

The control apparatus 100 performs control for the communication network 10.

For example, the control apparatus 100 includes a machine learning based controller for controlling communication in the communication network 10.

For example, the control apparatus 100 is a network device (for example, a proxy server, a gateway, a router, a switch, and/or the like) that transfers data in the communication network 10.

Note that the control apparatus 100 according to the first example embodiment is not limited to the network device that transfers data in the communication network 10. This will be described later in detail as a sixth example alteration of the first example embodiment.

2.2. Configuration of Control Apparatus (1) Functional Configuration

Figure 4:
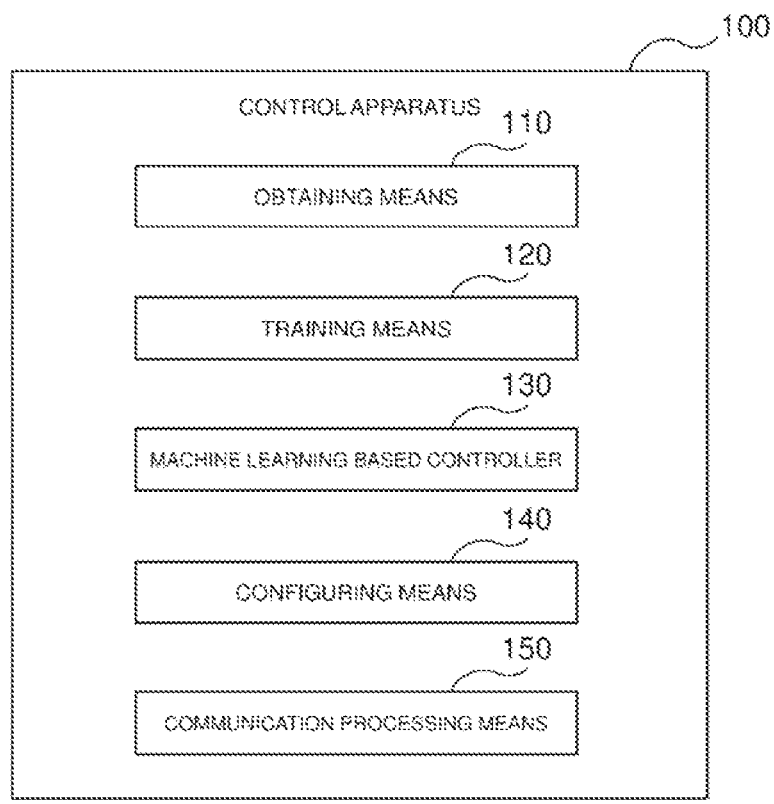
FIG. 4 is a block diagram illustrating an example of a schematic functional configuration of a control apparatus according to the first example embodiment.

FIG. 4 is a block diagram illustrating an example of a schematic functional configuration of the control apparatus 100 according to the first example embodiment. With reference to FIG. 4, the control apparatus 100 includes an obtaining means 110, a training means 120, a machine learning based controller 130, a configuring means 140, and a communication processing means 150.

The operations of each of the obtaining means 110, the training means 120, the machine learning based controller 130, the configuring means 140, and the communication processing means 150 will be described later.

(2) Hardware Configuration

Figure 5:
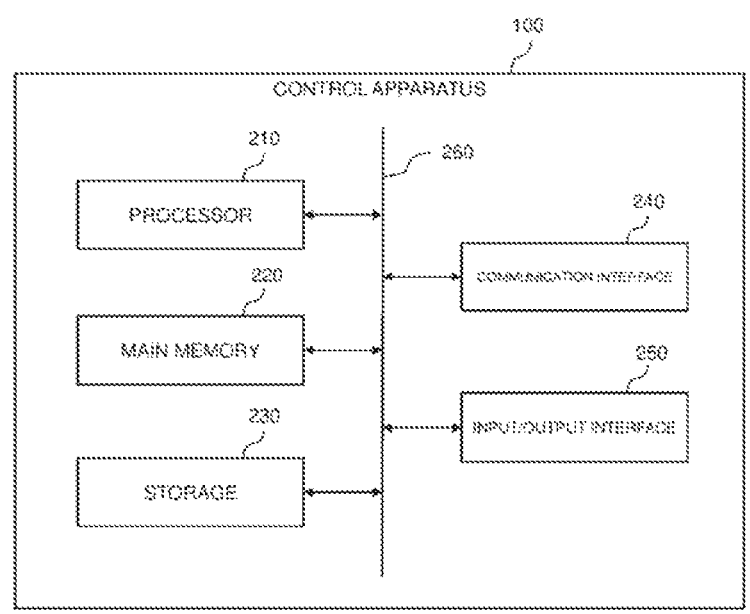
FIG. 5 is a block diagram illustrating an example of a schematic hardware configuration of the control apparatus according to the first example embodiment.

FIG. 5 is a block diagram illustrating an example of a schematic hardware configuration of the control apparatus 100 according to the first example embodiment. With reference to FIG. 5, the control apparatus 100 includes a processor 210, a main memory 220, a storage 230, a communication interface 240, and an input/output interface 250. The processor 210, the main memory 220, the storage 230, the communication interface 240, and the input/output interface 250 are connected to each other via a bus 260.

The processor 210 executes a program read from the main memory 220. As an example, the processor 210 is a central processing unit (CPU).

The main memory 220 stores a program and various pieces of data. As an example, the main memory 220 is a random access memory (RAM).

The storage 230 stores a program and various pieces of data. As an example, the storage 230 includes a solid state drive (SSD) and/or a hard disk drive (HDD).

The communication interface 240 is an interface for communication with another apparatus. As an example, the communication interface 240 is a network adapter or a network interface card.

The input/output interface 250 is an interface for connection with an input apparatus such as a keyboard, and an output apparatus such as a display.

Each of the obtaining means 110, the training means 120, the machine learning based controller 130, the configuring means 140, and the communication processing means 150 may be implemented with the processor 210 and the main memory 220, or may be implemented with the processor 210, the main memory 220, and the communication interface 240.

As a matter of course, the hardware configuration of the control apparatus 100 is not limited to the example described above. The control apparatus 100 may be implemented with another hardware configuration.

Alternatively, the control apparatus 100 may be virtualized. In other words, the control apparatus 100 may be implemented as a virtual machine. In this case, the control apparatus 100 (virtual machine) may operate as a physical machine (hardware) including a processor, a memory, and the like, and a virtual machine on a hypervisor. As a matter of course, the control apparatus 100 (virtual machine) may be distributed into a plurality of physical machines for operation.

The control apparatus 100 may include a memory (main memory 220) that stores a program (instructions), and one or more processors (processors 210) that can execute the program (instructions). The one or more processors may execute the program to perform the operations of the obtaining means 110, the training means 120, the machine learning based controller 130, the configuring means 140, and/or the communication processing means 150. The program may be a program for causing the processor(s) to execute the operations of the obtaining means 110, the training means 120, the machine learning based controller 130, the configuring means 140, and/or the communication processing means 150.

2.3. Operation (Training of Machine Learning Based Controller)

The control apparatus 100 (obtaining means 110) obtains work-related information related to human work in network operation. The control apparatus 100 (training means 120) trains the machine learning based controller 130 for controlling communication in the communication network 10, based on the work-related information.

(1) Work-Related Information

As described above, the work-related information is information related to human work in network operation.

Human Work in Network Operation

The network operation is, for example, network operation of the communication network 10. In other words, the human work is human work in network operation of the communication network 10.

The human work is, for example, a change of a network control parameter. In other words, the human work is a change of a network control parameter in network operation.

Note that the network operation and the human work according to the first example embodiment are not limited to the example described above. This will be described later in detail as a first example alteration of the first example embodiment.

Information Included in Work-Related Information (Work Information and Network State Information)

The work-related information includes, for example, work information indicating the human work and network state information indicating a network state corresponding to the human work. As will be described later, for example, the network state information is used as input data of machine learning, and the work information is used as output data of machine learning corresponding to the input data.

For example, the work-related information includes a plurality of sets of the work information and the network state information. More specifically, for example, the work-related information includes N sets of the work information and the network state information, and N is a number sufficiently large for machine learning.

As described above, the human work is, for example, a change of a network control parameter. In this case, as the change of the network control parameter, for example, the work information indicates increase or decrease of the network control parameter. More specifically, the work information may indicate whether the network control parameter has increased or decreased, or may indicate the amount of increase or decrease of the network control parameter.

As an example, a combination of the network state (NW state) and the network control parameter (NW control parameter) is as follows:

[NW State] Throughput and/or packet arrival interval
[NW Control Parameter] Priority and/or band For example, the network control parameter is a parameter for each flow, and the network state is also a network state for each flow. Each flow is, for example, identified by a transmission address, a reception address, and a port number.

As a matter of course, the network state and the network control parameter according to the first example embodiment are not limited to the example described above. This will be described later in detail as a second example alteration of the first example embodiment.

As described above, for example, the control apparatus 100 is a network device (for example, a proxy server, a gateway, a router, a switch, and/or the like) that transfers data in the communication network 10. In this case, for example, the network state is a network state (for example, throughput and/or a packet arrival interval) observed in the control apparatus 100, and for example, the network control parameter is a network control parameter (for example, priority and/or a band) configured in the control apparatus 100.

Note that, as described above, the control apparatus 100 according to the first example embodiment is not limited to the network device that transfers data in the communication network 10. This will be described later in detail as the sixth example alteration of the first example embodiment.

The network state is a state of the communication network (for example, the communication network 10). It can also be said that the network state is a state of communication in the communication network.

Generation of Work-Related Information

The work-related information is, for example, generated based on a log of the human work. As described above, the human work is, for example, a change of a network control parameter, and in this case, the work-related information is generated based on the log of the change of the network control parameter.

For example, the work information included in the work-related information is directly generated from the log, and the network state information included in the work-related information is generated from packet capture information corresponding to the log.

Figure 7:
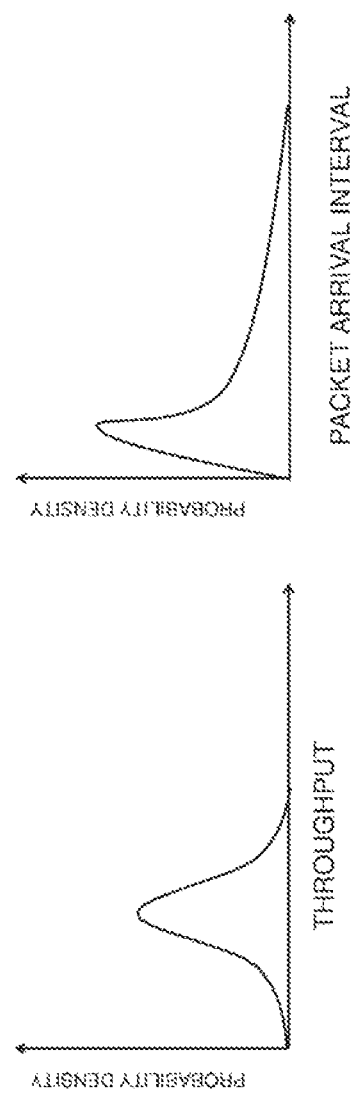
FIG. 7 is a diagram illustrating an example of probability density distribution of a network state according to the first example embodiment.

FIG. 6 illustrates an example of a work log of a change of a network control parameter according to the first example embodiment. With reference to FIG. 6, the work log includes times at which a set of a parameter 21 and a parameter 23 (for example, a set of priority and a band) being network control parameters is changed and their change values. In this example, the set of the parameter 21 and the parameter 23 is changed at time 25 and time 27. For example, at the time 27, the parameter 23 is changed from a to b. For example, from the work log as described above, the change of the network control parameters can be known. Thus, the work information indicating the change of the network control parameter can be directly generated from the work log as described above. In addition, from the packet capture information of a predetermined time period immediately before the time at which the network control parameter is changed (for example, the time 27 at which the parameter 23 is changed), the network state (for example, throughput and/or a packet arrival interval) corresponding to the change of the network control parameter (for example, the parameter 23) can be known. For example, from the packet capture information, statistical value(s) (for example, an average value, a mode, a median, a maximum value, a minimum value, a variance, a standard deviation, and/or the like) of the network state in the predetermined time period can be calculated. Thus, the network state information indicating the network state (for example, the statistical value) corresponding to the change of the network control parameter may be generated from the packet capture information identified from the work log. Note that, for example, probability density distribution of the network state in the predetermined time period as illustrated in FIG. 7 may be generated for calculation of the statistical value and be used.

(2) Obtaining of Work-Related Information

As described above, the control apparatus 100 (obtaining means 110) obtains the work-related information.

For example, the work-related information is (manually or automatically) generated in an apparatus other than the control apparatus 100, and is provided to the control apparatus 100. Then, the control apparatus 100 (obtaining means 110) obtains the work-related information.

Note that, in the first example embodiment, the method of obtaining the work-related information is not limited to the example described above. This will be described later in detail as a fourth example alteration of the first example embodiment.

(3) Training

As described above, the control apparatus 100 (training means 120) trains the machine learning based controller 130 for controlling communication in the communication network 10, based on the work-related information.

For example, the control apparatus 100 (training means 120) trains the machine learning based controller 130 by using the network state information included in the work-related information as input data and using the work information included in the work-related information as output data corresponding to the input data. Specifically, for example, the control apparatus 100 (training means 120) trains the machine learning based controller 130 by providing the network state information to the machine learning based controller 130 as input data and the work information as output data corresponding to the input data.

For example, the machine learning based controller 130 is a supervised learning based controller, and the control apparatus 100 (training means 120) trains the machine learning based controller 130 by using the work-related information as training data of supervised learning. Specifically, for example, the training data includes input data, and correct answer data (output data) corresponding to the input data. The control apparatus 100 (training means 120) provides the network state information to the machine learning based controller 130 as the input data, and provides the work information to the machine learning based controller 130 as the correct answer data (the output data). The training data may be referred to as teaching data.

Owing to such training, the machine learning based controller 130 can learn how the network control parameter is to be changed according to the network state, based on human work (change of the network control parameter) in network operation. As a result, the machine learning based controller 130 can control communication in the communication network 10 similarly to human work. Thus, for example, by using the machine learning based controller 130 for control of communication in the communication network 10, control of communication in the communication network 10 can be stabilized.

Note that the machine learning based controller 130 according to the first example embodiment is not limited to the supervised learning based controller. This will be described later in detail as a fifth example alteration of the first example embodiment.

(4) Flow of Processing

Figure 8:
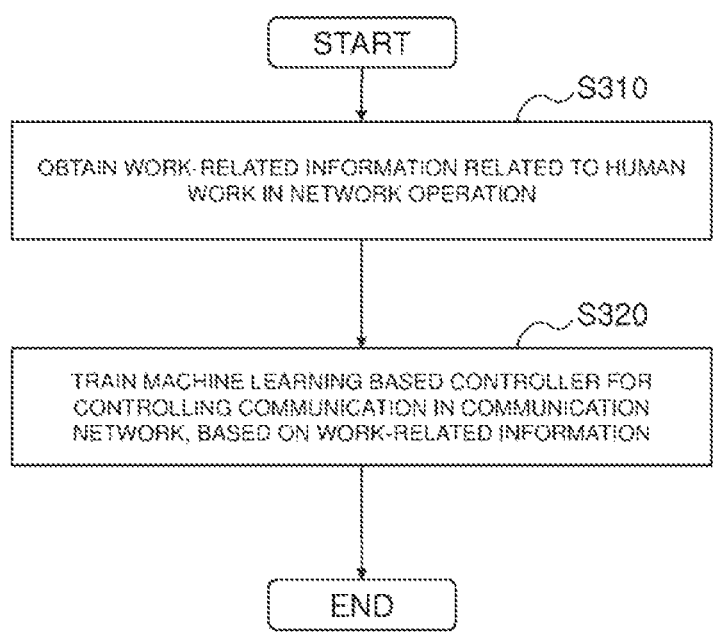
FIG. 8 is a flowchart for illustrating an example of a general flow of training processing according to the first example embodiment.

FIG. 8 is a flowchart for illustrating an example of a general flow of training processing according to the first example embodiment.

The control apparatus 100 (obtaining means 110) obtains work-related information related to human work in network operation (S310).

The control apparatus 100 (training means 120) trains the machine learning based controller 130 for controlling communication in the communication network 10, based on the work-related information (S320).

(5) Operation after Training

The machine learning based controller 130 is used for control of communication in the communication network 10 after training based on the work-related information.

Specifically, for example, the machine learning based controller 130 selects a change of the network control parameter (for example, priority and/or a band) from the network state (for example, throughput and/or a packet arrival interval) in the communication network 10, and outputs the change.

As described above, for example, the control apparatus 100 is a network device (for example, a proxy server, a gateway, a router, a switch, and/or the like) that transfers data in the communication network 10. In this case, the network state is a network state (for example, throughput and/or a packet arrival interval) observed in the control apparatus 100, and for example, the network control parameter is a network control parameter (for example, priority and/or a band) configured in the control apparatus 100. In other words, the machine learning based controller 130 selects a change of the network control parameter configured in the control apparatus 100 from the network state observed in the control apparatus 100, and outputs the change. The control apparatus 100 (configuring means 140) configures the changed network control parameter in the control apparatus 100, according to the selected change of the network control parameter. As a result, the control apparatus 100 (communication processing means 150) transfers data (for example, packets) according to the changed network control parameter. In this manner, for example, the machine learning based controller 130 controls the communication in the communication network 10 by selecting a change of the network control parameter.

2.4. Example Alterations

First to seventh example alterations of the first example embodiment will be described. Note that two or more example alterations of the first to seventh example alterations of the first example embodiment may be combined.

(1) First Example Alteration

As described above, the machine learning based controller 130 is trained based on the work-related information related to human work in network operation. As described above, the network operation is, for example, network operation of the communication network 10. However, the first example embodiment is not limited to the example described above.

In the first example alteration of the first example embodiment, the network operation may be network operation of another communication network different from the communication network 10. In other words, the machine learning based controller 130 may be trained based on the work-related information related to human work in such another communication network. Such another communication network may be a network similar to the communication network 10.

In this manner, for example, even when there is no past performance of operation of the communication network 10, the machine learning based controller that can be used for control of communication in the communication network 10 can be achieved.

(2) Second Example Alteration

As described above, the work-related information includes, for example, work information indicating the human work and network state information indicating a network state corresponding to the human work. As described above, the human work is, for example, a change of the network control parameter, and the work information indicates increase or decrease of the network control parameter, for example, as the change of the network control parameter. In addition, as described above, as an example, the network state is throughput and/or a packet arrival interval, and the network control parameter is priority and/or a band. As described above, for example, the network control parameter is a parameter for each flow, and the network state is also a network state for each flow. However, as a matter of course, the first example embodiment is not limited to the example described above.

In the second example alteration of the first example embodiment, first, the network control parameter need not be a parameter for each flow, and the network state need not be a network state for each flow either. The network control parameter may be a parameter regarding the entire communication that may include a plurality of flows, and the network state may also be a network state regarding the entire communication.

The network state need not be throughput and/or a packet arrival interval, and the network control parameter need not be priority and/or a band. A combination of the network state (NW state) and the network control parameter (NW control parameter) may be as follows:

[Example 1 (Example of Control of Transmission Control Protocol (TCP) Flow)]
  [NW State] Number of active flows, available band and/or,
    Previous buffer size of Internet Protocol (IP)
  [NW Control Parameter] Transmission buffer size
[Example 2 (Example of Control of Flow Rate of Video Traffic)]
  [NW State] Quality of experience (QoE) of video
    (For example, a bit rate of a video and/or resolution of a video)
  [NW Control Parameter] Upper limit of throughput
[Example 3 (Example of Robot Control)]
  [NW State] Packet arrival interval and/or statistical value of packet size
    (For example, a maximum value, a minimum value, an average value, a standard deviation, or the like)
  [NW Control Parameter] Packet transmission interval In addition, as the change of the network control parameter, the work information may indicate the changed value itself of the network control parameter, instead of indicating increase or decrease of the network control parameter. For example, with reference to FIG. 6 again, as the change of the parameter at the time 27, the changed value (a, b) of the set of the parameter 21 and the parameter 23 may be indicated, instead of indicating increase or decrease (for example, b−a) of the parameter 23.

(3) Third Example Alteration

As described above, the work-related information is, for example, generated based on a log of the human work. However, the first example embodiment is not limited to the example described above.

In the third example alteration of the first example embodiment, the work-related information may be generated based on a work standard for the human work. As described above, the human work is, for example, a change of a network control parameter, and in this case, the work-related information may be generated based on a work standard for the change of the network control parameter. The work standard may be a rule for human work in network operation, or may be know-how or reference information for human work in network operation.

For example, the work standard may include a network state and a change (specifically, human work) of a network control parameter corresponding to the network state, and a sample of a set of the network state and the change (specifically, human work) of the network control parameter may be generated based on the work standard as the work-related information (the network state information and the work information).

In this manner, even if there is no work log, training data (specifically, the work-related information) can be generated.

(4) Fourth Example Alteration

As described above, for example, the work-related information is (manually or automatically) generated in an apparatus other than the control apparatus 100, and is provided to the control apparatus 100. However, the first example embodiment is not limited to the example described above.

In the fourth example alteration of the first example embodiment, the work-related information may be generated by the control apparatus 100. In this case, the control apparatus 100 may further include a generating means, and the control apparatus 100 (generating means) may generate the work-related information.

(5) Fifth Example Alteration

As described above, for example, the machine learning based controller 130 is a supervised learning based controller. However, the first example embodiment is not limited to the example described above.

In the fifth example alteration of the first example embodiment, the machine learning based controller 130 may be a reinforcement learning based controller that outputs an action based on an input state. In this case, the control apparatus 100 (training means 120) may train the machine learning based controller 130, considering the work-related information as an input state and an output action in reinforcement learning. Specifically, for example, the control apparatus 100 (training means 120) may train the machine learning based controller 130 (reinforcement learning based controller) by using the network state information as the input state and using the work information as the output action. In other words, the control apparatus 100 (training means 120) may provide the network state information to the machine learning based controller 130 as the input state, and provide the work information to the machine learning based controller 130 as the output action.

The work-related information may further include reward information indicating a reward corresponding to the human work, in addition to the network state information and the work information. The work-related information may include a plurality of sets of the work information, the network state information, and the reward information. The control apparatus 100 (training means 120) may train the machine learning based controller 130 (reinforcement learning based controller), considering the work-related information as an input state, an output action, and an obtained reward in reinforcement learning. Specifically, for example, the control apparatus 100 (training means 120) may train the machine learning based controller 130 by using the reward information as the obtained reward. In other words, the control apparatus 100 (training means 120) may provide the reward information to the machine learning based controller 130 as the obtained reward.

The reward indicated by the reward information may be constant regardless of human work (change of the network control parameter) corresponding to the reward. In other words, the human work may be considered worth a certain reward. Alternatively, the reward indicated by the reward information may be calculated according to a standard of the reward of reinforcement learning from the packet capture information in a predetermined time period after human work (change of the network control parameter) corresponding to the reward.

Training the reinforcement learning based controller (in other words, the machine learning based controller 130) by using the work-related information related to the human work as described above can cause reinforcement learning to proceed in advance. Thus, learning in the reinforcement learning based controller (in other words, the machine learning based controller 130) can converge without requiring a long period of time after starting to use the reinforcement learning based controller (in other words, the machine learning based controller 130) for control of communication in the communication network 10. Therefore, control of communication in the communication network 10 can be stabilized.

(6) Sixth Example Alteration

Figure 9:
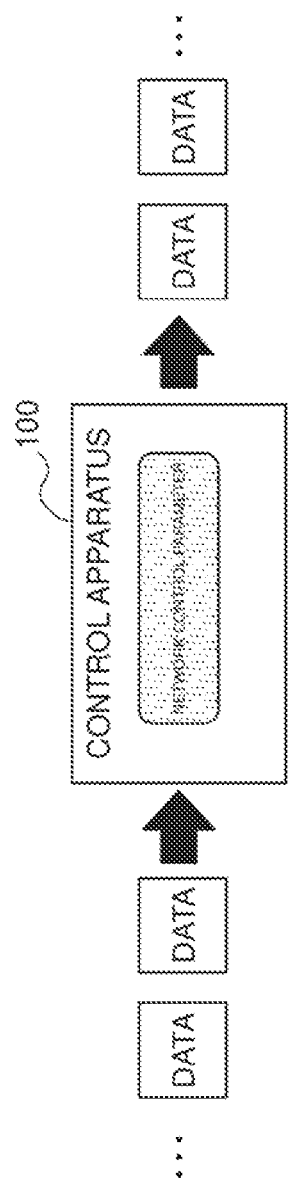
FIG. 9 is a diagram for illustrating an example of operation of the control apparatus according to the first example embodiment.

As described above, for example, the control apparatus 100 is a network device (for example, a proxy server, a gateway, a router, a switch, and/or the like) that transfers data in the communication network 10 (see FIG. 9). As described above, for example, when the machine learning based controller 130 selects a change of a network control parameter, the control apparatus 100 (configuring means 140) configures the changed network control parameter in the control apparatus 100 (see FIG. 9). However, the control apparatus 100 according to the first example embodiment is not limited to the example described above.

First Example

Figure 10:
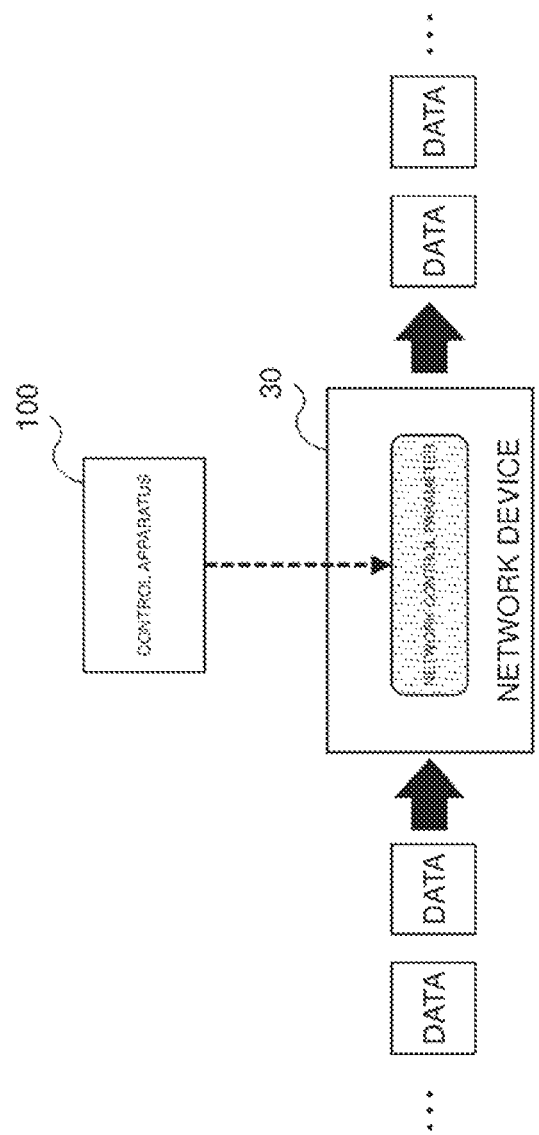
FIG. 10 is a diagram for illustrating a first example of the operation of the control apparatus according to a sixth example alteration of the first example embodiment.

In the sixth example alteration of the first example embodiment, as a first example, as illustrated in FIG. 10, the control apparatus 100 may be an apparatus (for example, a network controller) that controls a network device 30 that transfers data in the communication network 10, instead of a network device itself that transfers data in the communication network 10.

The machine learning based controller 130 may select a change of the network control parameter (for example, priority and/or a band) configured in the network device 30 from the network state (for example, throughput and/or a packet arrival interval) observed in the network device 30, and output the change.

As illustrated in FIG. 10, when the machine learning based controller 130 selects a change of the network control parameter, the control apparatus 100 (configuring means 140) may cause the network device 30 to configure the changed network control parameter. As an example, the control apparatus 100 (configuring means 140) may transmit parameter information (for example, a command for instructing a change of the network control parameter) indicating a change of the network control parameter to the network device 30, and the network device 30 may configure the changed network control parameter, based on the parameter information. As a result, the network device 30 may transfer data (for example, packets) according to the changed network control parameter.

Second Example

Figure 11:
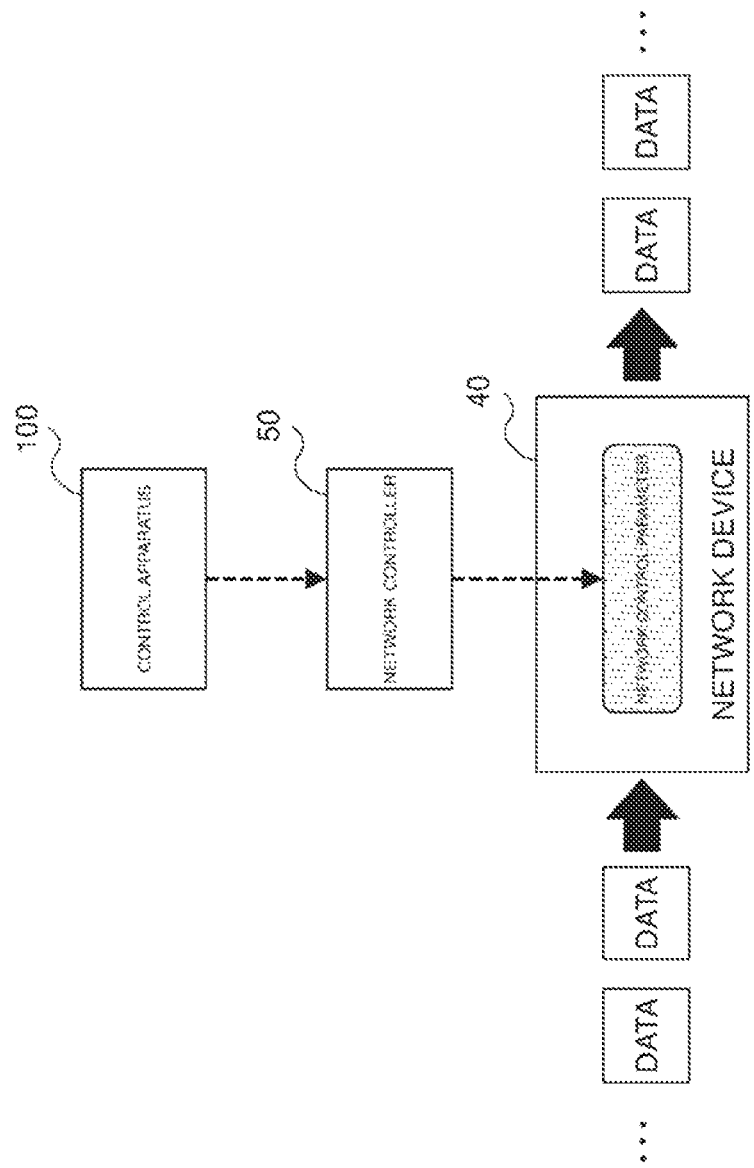
FIG. 11 is a diagram for illustrating a second example of the operation of the control apparatus according to the sixth example alteration of the first example embodiment.

As a second example, as illustrated in FIG. 11, a network controller 50 may control a network device 40 that transfers data in the communication network 10, and the control apparatus 100 may be an apparatus that controls or assists the network controller 50.

The network device 40 may observe the network state, without the control apparatus 100 itself observing the network state of the communication network 10. The control apparatus 100 may obtain information indicating the network state from the network device 40 or the network controller 50. The machine learning based controller 130 may select a change of the network control parameter (for example, priority and/or a band) configured in the network device 40 from the network state (for example, throughput and/or a packet arrival interval) observed in the network device 40, and output the change.

As illustrated in FIG. 11, when the machine learning based controller 130 selects a change of the network control parameter, the control apparatus 100 (configuring means 140) may transmit first parameter information (for example, a command for instructing a change of the network control parameter or assist information reporting a change of the network control parameter) indicating a change of the network control parameter to the network controller 50. In addition, the network controller 50 may transmit second parameter information (for example, a network command for instructing a change of the control parameter) indicating a change of the network control parameter to the network device 40 based on the first parameter information, and the network device 40 may configure the changed network control parameter, based on the second parameter information. As a result, the network device 40 may transfer data (for example, packets) according to the changed network control parameter.

Third Example

Figure 12:
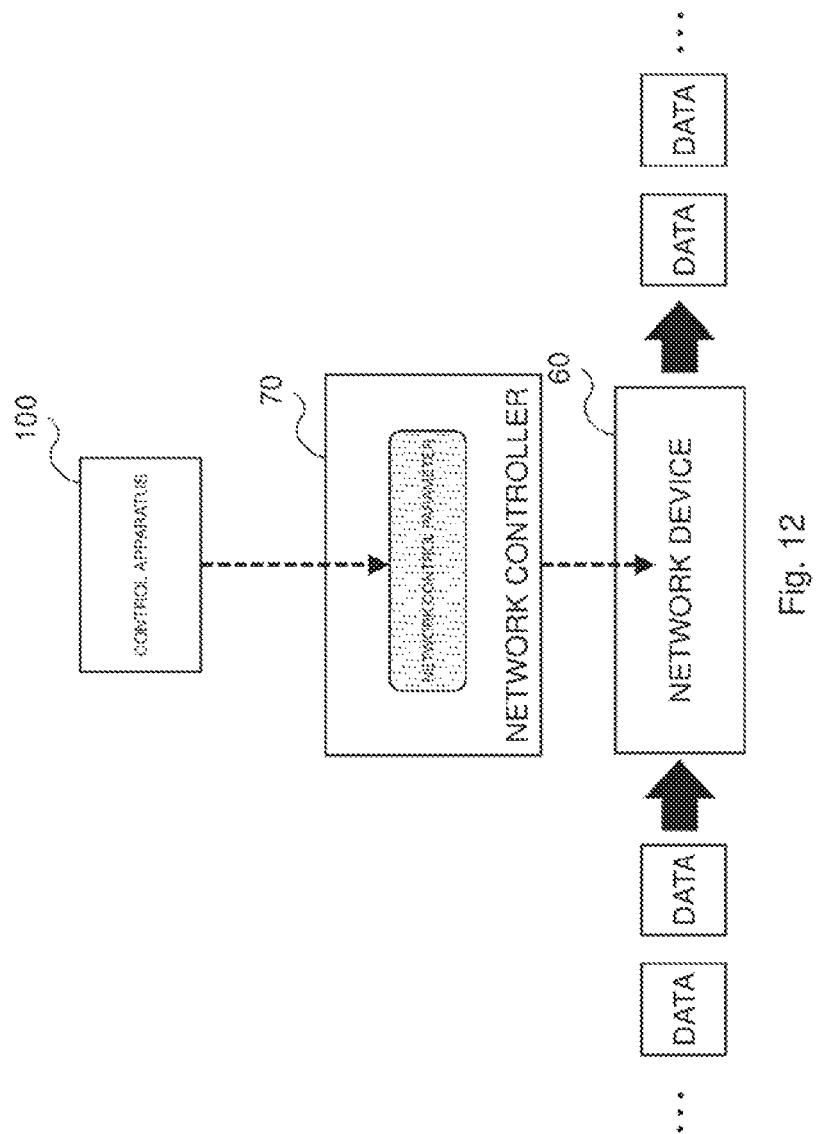
FIG. 12 is a diagram for illustrating a third example of the operation of the control apparatus according to the sixth example alteration of the first example embodiment.

As a third example, as illustrated in FIG. 12, a network controller 70 may control a network device 60 that transfers data in the communication network 10, and the control apparatus 100 may be an apparatus that controls the network controller 70.

The network device 60 may observe the network state, without the control apparatus 100 itself observing the network state of the communication network 10. The control apparatus 100 may obtain information indicating the network state from the network device 60 or the network controller 70. The machine learning based controller 130 may select a change of the network control parameter configured in the network controller 70 from the network state observed in the network device 60, and output the change.

As illustrated in FIG. 12, when the machine learning based controller 130 selects a change of the network control parameter, the control apparatus 100 (configuring means 140) may cause the network controller 70 to configure the changed network control parameter. As an example, the control apparatus 100 (configuring means 140) may transmit parameter information (for example, a command for instructing a change of the network control parameter) indicating a change of the network control parameter to the network controller 70, and the network controller 70 may configure the changed network control parameter, based on the parameter information. As a result, the network controller 70 may control the network device 60 according to the changed network control parameter, and the network device 60 may transfer data (for example, packets) according to control by the network controller 70.

(7) Seventh Example Alteration

As described above, for example, the control apparatus 100 includes the obtaining means 110, the training means 120, the machine learning based controller 130, the configuring means 140, and the communication processing means 150. However, the control apparatus 100 according to the first example embodiment is not limited to the example described above.

In the seventh example alteration of the first example embodiment, for example, the machine learning based controller 130 may be included in another apparatus instead of being included in the control apparatus 100. In this case, the control apparatus 100 (training means 120) may train the machine learning based controller 130 by providing the work-related information to the machine learning based controller 130 included in such another apparatus. The configuring means 140 may also be included in such another apparatus instead of being included in the control apparatus 100. Note that, when the machine learning based controller 130 is not included in the control apparatus 100, in the description in the sixth example alteration, the "control apparatus 100" may be replaced by an "apparatus including the machine learning based controller 130".

In the seventh example alteration of the first example embodiment, for example, the configuring means 140 may be included in the machine learning based controller 130. In other words, the machine learning based controller 130 may perform the operation of the configuring means 140 described above.

In the seventh example alteration of the first example embodiment, for example, the communication processing means 150 that transfers data (for example, packets) may be included in another apparatus instead of being included in the control apparatus 100. For example, in a case as in the sixth example alteration, the communication processing means 150 may be included in a network device instead of being included in the control apparatus 100.

As described in the fourth example alteration, the control apparatus 100 may further include a generating means.

3. Second Example Embodiment

With reference to FIG. 13 to FIG. 16, a second example embodiment of the present disclosure will be described.

3.1. Configuration of System

Figure 13:
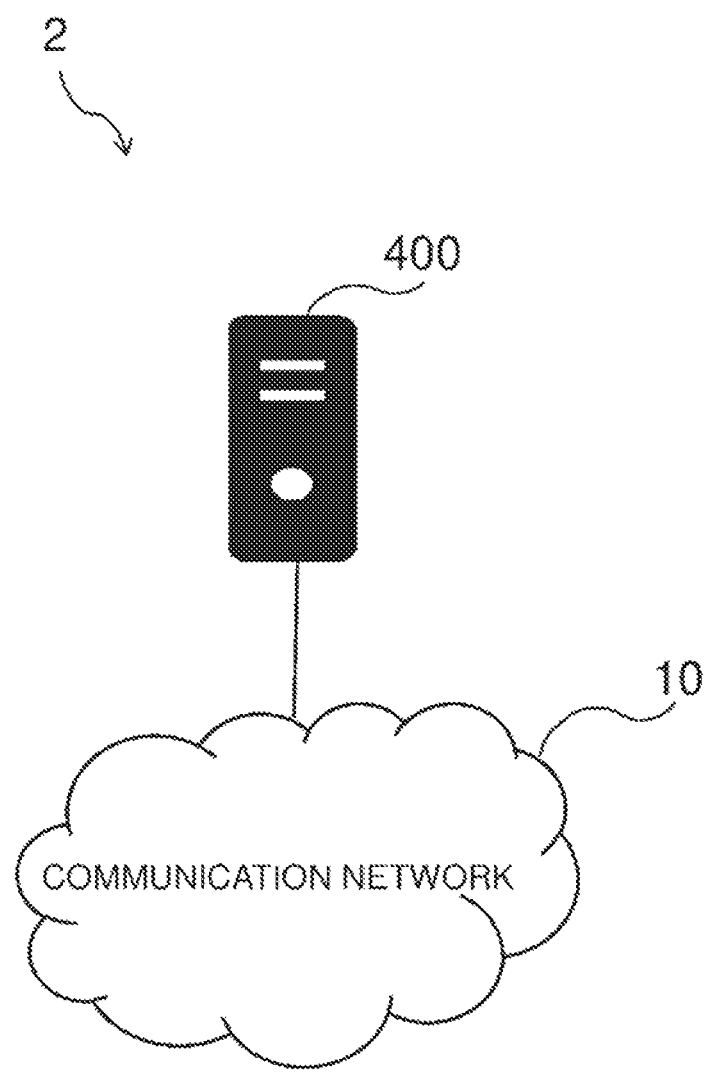
FIG. 13 is a diagram illustrating an example of a schematic configuration of a system according to a second example embodiment.

FIG. 13 illustrates an example of a schematic configuration of a system 2 according to the second example embodiment. With reference to FIG. 13, the system 2 includes a communication network 10 and a control apparatus 400.

(1) Communication Network 10

Description regarding the communication network 10 is the same as the description regarding the communication network 10 of the first example embodiment. Thus, overlapping description will be omitted here.

(2) Control Apparatus 400

The control apparatus 400 performs control for the communication network 10.

For example, the control apparatus 400 includes a machine learning based controller and a reinforcement learning based controller for controlling communication in the communication network 10. For example, the machine learning based controller is a supervised learning based controller.

In particular, in the second example embodiment, for example, the control apparatus 400 further includes a reinforcement learning based controller for controlling communication in the communication network 10.

For example, the control apparatus 400 is a network device (for example, a proxy server, a gateway, a router, a switch, and/or the like) that transfers data in the communication network 10.

Note that the control apparatus 400 according to the second example embodiment is not limited to the network device that transfers data in the communication network 10. This will be described later in detail as the seventh example alteration of the second example embodiment.

3.2. Configuration of Control Apparatus (1) Functional Configuration

Figure 14:
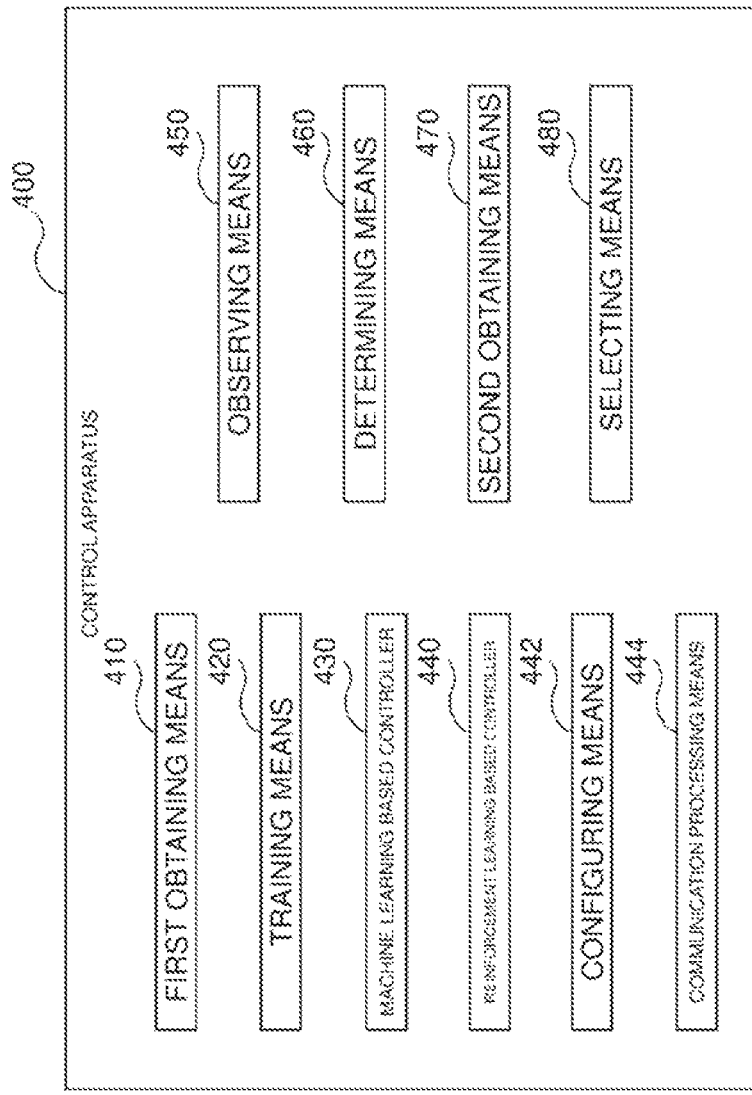
FIG. 14 is a block diagram illustrating an example of a schematic functional configuration of the control apparatus according to the second example embodiment.

FIG. 14 is a block diagram illustrating an example of a schematic functional configuration of the control apparatus 400 according to the second example embodiment. With reference to FIG. 14, the control apparatus 400 includes a first obtaining means 410, a training means 420, a machine learning based controller 430, a reinforcement learning based controller 440, a configuring means 442, a communication processing means 444, an observing means 450, a determining means 460, a second obtaining means 470, and a selecting means 480.

The operation of each of the first obtaining means 410, the training means 420, the machine learning based controller 430, the reinforcement learning based controller 440, the configuring means 442, the communication processing means 444, the observing means 450, the determining means 460, the second obtaining means 470, and the selecting means 480 will be described later.

(2) Hardware Configuration

Figure 15:
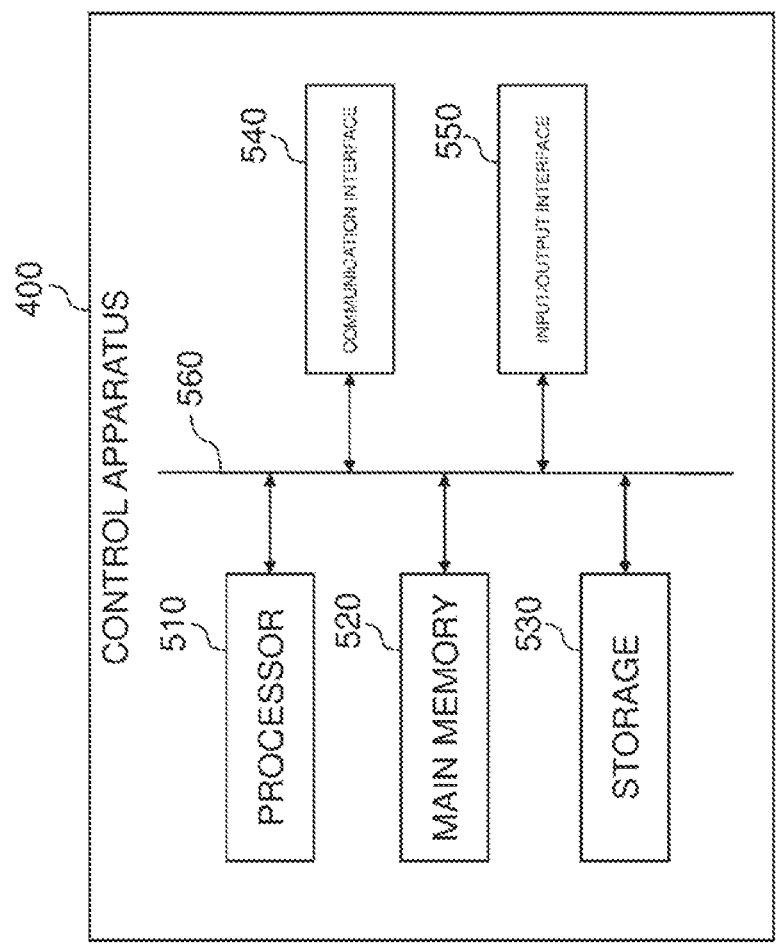
FIG. 15 is a block diagram illustrating an example of a schematic hardware configuration of the control apparatus according to the second example embodiment.

FIG. 15 is a block diagram illustrating an example of a schematic hardware configuration of the control apparatus 400 according to the second example embodiment. With reference to FIG. 15, the control apparatus 400 includes a processor 510, a main memory 520, a storage 530, a communication interface 540, and an input/output interface 550. The processor 510, the main memory 520, the storage 530, the communication interface 540, and the input/output interface 550 are connected to each other via a bus 560.

The processor 510 executes a program read from the main memory 520. As an example, the processor 510 is a CPU.

The main memory 520 stores programs and various pieces of data. As an example, the main memory 520 is a RAM.

The storage 530 stores a program and various pieces of data. As an example, the storage 530 includes an SSD and/or an HDD.

The communication interface 540 is an interface for communication with another apparatus. As an example, the communication interface 540 is a network adapter or a network interface card.

The input/output interface 550 is an interface for connection with an input apparatus such as a keyboard, and an output apparatus such as a display.

Each of the first obtaining means 410, the training means 420, the machine learning based controller 430, the reinforcement learning based controller 440, the configuring means 442, the communication processing means 444, the observing means 450, the determining means 460, the second obtaining means 470, and the selecting means 480 may be implemented with the processor 510 and the main memory 520, or may be implemented with the processor 510, the main memory 520, and the communication interface 540.

As a matter of course, the hardware configuration of the control apparatus 400 is not limited to the example described above. The control apparatus 400 may be implemented with another hardware configuration.

Alternatively, the control apparatus 400 may be virtualized. In other words, the control apparatus 400 may be implemented as a virtual machine. In this case, the control apparatus 400 (virtual machine) may operate as a physical machine (hardware) including a processor, a memory, and the like, and a virtual machine on a hypervisor. As a matter of course, the control apparatus 400 (virtual machine) may be distributed into a plurality of physical machines for operation.

The control apparatus 400 may include a memory (main memory 520) that stores a program (instructions), and one or more processors (processors 510) that can execute the program (instructions). The one or more processors may execute the program to perform the operations of the first obtaining means 410, the training means 420, the machine learning based controller 430, the reinforcement learning based controller 440, the configuring means 442, the communication processing means 444, the observing means 450, the determining means 460, the second obtaining means 470, and/or the selecting means 480. The program may be a program for causing the processor(s) to execute the operations of the first obtaining means 410, the training means 420, the machine learning based controller 430, the reinforcement learning based controller 440, the configuring means 442, the communication processing means 444, the observing means 450, the determining means 460, the second obtaining means 470, and/or the selecting means 480.

3.3. First Operation (Training of Machine Learning Based Controller)

The control apparatus 400 (first obtaining means 410) obtains work-related information related to human work in network operation. The control apparatus 400 (training means 420) trains the machine learning based controller 430 for controlling communication in the communication network 10, based on the work-related information.

In other words, similarly to training of the machine learning based controller 130 in the first example embodiment, in the second example embodiment, the machine learning based controller 430 is trained based on the work-related information.

Description regarding "(1) Work-Related Information", "(2) Obtaining of Work-Related Information", "(3) Training", "(4) Flow of Processing", and "(5) Operation after Training" according to the second example embodiment is the same as the description regarding those according to the first example embodiment except for differences of the reference signs. Thus, overlapping description will be omitted here. Note that, regarding the differences of the reference signs, the control apparatus 100, the obtaining means 110, the training means 120, the machine learning based controller 130, the configuring means 140, and the communication processing means 150 according to the first example embodiment correspond to the control apparatus 400, the first obtaining means 410, the training means 420, the machine learning based controller 430, the configuring means 442, and the communication processing means 444 according to the second example embodiment, respectively.

Note that, in the second operation (selection of controller) described below, the machine learning based controller 430 is a machine learning based controller trained based on the work-related information.

Unlike the machine learning based controller 130 in the fifth example alteration of the first example embodiment, the machine learning based controller 430 according to the second example embodiment is not a reinforcement learning based controller. The machine learning based controller 430 according to the second example embodiment is, for example, a supervised learning based controller similarly to the machine learning based controller 130 in the main example of the first example embodiment.

3.4. Second Operation (Selection of Controller)

For example, the control apparatus 400 (selecting means 480) selects one of the reinforcement learning based controller 440 for controlling communication in the communication network 10 and the machine learning based controller 430 for controlling communication in the communication network 10, based on information related to the state of the communication network 10. In other words, the control apparatus 400 (selecting means 480) selects one controller used for control of communication in the communication network 10 out of the machine learning based controller 430 and the reinforcement learning based controller 440.

Figure 16:
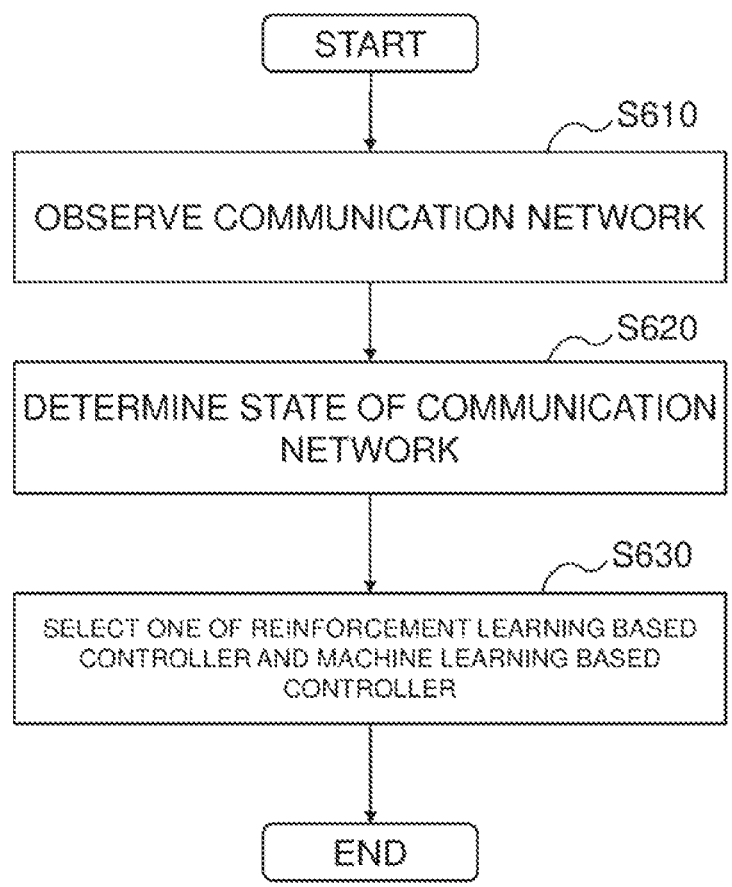
FIG. 16 is a flowchart for illustrating an example of a general flow of controller selection processing according to the second example embodiment.

FIG. 16 is a flowchart for illustrating an example of a general flow of controller selection processing according to the second example embodiment. In the following, with reference to FIG. 16, operation for selection of the controller will be described.

(1) Observation (S610)

For example, the control apparatus 400 (observing means 450) observes the communication network 10 (S610).

More specifically, for example, the control apparatus 400 (observing means 450) observes throughput in the communication network 10 and/or a packet loss rate in the communication network 10. For example, the control apparatus 400 is a network device that transfers data in the communication network 10, and the throughput to be observed is throughput in the control apparatus 400, and the packet loss rate to be observed is a packet loss rate in the control apparatus 400.

For example, the control apparatus 400 (observing means 450) generates observation information regarding the communication network 10. The observation information indicates results of observation of the communication network 10. More specifically, for example, the observation information indicates throughput in the communication network 10 and/or a packet loss rate in the communication network 10.

(2) Determination (S620)

For example, the control apparatus 400 (determining means 460) determines a state of the communication network 10 (S620).

State of Communication Network 10

For example, the state to be determined is a congestion state of the communication network 10. In other words, the control apparatus 400 (determining means 460) determines a congestion state of the communication network 10.

More specifically, for example, the control apparatus 400 (determining means 460) determines whether the communication network 10 is congested over a certain level.

Note that the state determined here (state of the communication network 10) is merely a state determined for selection of the controller, and does not mean "state" being input of reinforcement learning.

Determination Method

For example, the control apparatus 400 (determining means 460) determines the state of the communication network 10, based on the observation information regarding the communication network 10.

As described above, for example, the observation information indicates throughput in the communication network 10 and/or a packet loss rate in the communication network 10. In this case, the control apparatus 400 (determining means 460) determines the state of the communication network 10 (for example, whether the communication network 10 is congested over the certain level), based on the throughput in the communication network 10 and/or the packet loss rate in the communication network 10.

As an example, when the throughput in the communication network 10 is smaller than a predetermined threshold, or when the packet loss rate in the communication network 10 is larger than a predetermined threshold, the control apparatus 400 (determining means 460) determines that the communication network 10 is congested over the certain level. Otherwise, the control apparatus 400 (determining means 460) determines that the communication network 10 is not congested over the certain level.

Alternatively, when the throughput in the communication network 10 is smaller than the predetermined threshold, and the packet loss rate in the communication network 10 is larger than the predetermined threshold, the control apparatus 400 (determining means 460) may determine that the communication network 10 is congested over the certain level. Otherwise, the control apparatus 400 (determining means 460) may determine that the communication network 10 is not congested over the certain level.

As a matter of course, the control apparatus 400 (determining means 460) may determine whether the communication network 10 is congested over the certain level, based on only one of the throughput and the packet loss rate, not based on both of the throughput and the packet loss rate as described above.

Information (State Information) Related to State of Communication Network 10

For example, the control apparatus 400 (determining means 460) generates information (hereinafter referred to as "state information") related to the state (specifically, the determined state) of the communication network 10. Note that the "state information" here is information different from the "network state information" (specifically, information indicating the network state corresponding to the human work, which is information included in the work-related information) described in the first example embodiment.

For example, the state information indicates the state of the communication network 10 (in other words, the determined state). More specifically, for example, the state information indicates whether the communication network 10 is congested over the certain level.

Note that the state information is not limited to the example described above. This will be described later in detail as the fifth example alteration of the second example embodiment.

(3) Selection (S630)

The control apparatus 400 (second obtaining means 470) obtains the state information. The control apparatus 400 (selecting means 480) selects one of the machine learning based controller 430 and the reinforcement learning based controller 440, based on the state information (S630). In other words, the control apparatus 400 (selecting means 480) selects one controller used for control of communication in the communication network 10 out of the machine learning based controller 430 and the reinforcement learning based controller 440, based on the state information. Through the selection as above, the machine learning based controller 430 and the reinforcement learning based controller 440 are selectively used for control of communication in the communication network 10.

For example, the control apparatus 400 (selecting means 480) selects the machine learning based controller 430 when the communication network 10 is congested over the certain level, and selects the reinforcement learning based controller 440 when the communication network 10 is not congested over the certain level. In other words, when the communication network 10 is congested over the certain level, the machine learning based controller 430 trained based on the work-related information related to the human work in network operation is used, or otherwise, the reinforcement learning based controller 440 is used.

Note that the selected controller (the machine learning based controller 430 or the reinforcement learning based controller 440) is used for control of communication in the communication network 10. Specifically, for example, the selected controller selects a change of the network control parameter (for example, priority and/or a band) from the network state (for example, throughput and/or a packet arrival interval) in the communication network 10, and outputs the change. As described above, for example, the control apparatus 400 is a network device (for example, a proxy server, a gateway, a router, a switch, and/or the like) that transfers data in the communication network 10, and the control apparatus 400 (configuring means 442) configures the changed network control parameter in the control apparatus 400 according to the selected change of the network control parameter. As a result, the control apparatus 400 (communication processing means 444) transfers data (for example, packets) according to the changed network control parameter. In this manner, for example, by selecting a change of the network control parameter, the selected controller (the machine learning based controller 430 or the reinforcement learning based controller 440) controls communication in the communication network 10.

In the above, selection of the controller according to the second example embodiment is described. When the communication network 10 is extremely congested, the network state is unstable, and if the reinforcement learning based controller 440 is used, erroneous learning may occur in reinforcement learning, and learning may not converge. As a result, by using the reinforcement learning based controller 440, control of communication of the communication network 10 may become unstable. However, according to selection of the controller as described above, when the communication network 10 is extremely congested, the machine learning based controller 430 can be used, and similarly to the human work, control of communication in the communication network 10 can be performed. Therefore, control of communication of the communication network 10 can be stabilized.

According to selection of the controller as described above, when the communication network 10 is not extremely congested, the reinforcement learning based controller 440 can be used, and optimal control of communication in the communication network 10 can be performed. Therefore, control of communication of the communication network 10 can be stabilized.

3.5. Example Alterations

Description regarding first to fourth example alterations of the second example embodiment is the same as the description regarding the first to fourth example alterations of the first example embodiment except for differences of the reference signs. Thus, overlapping description will be omitted here. Note that, regarding the differences of the reference signs, the control apparatus 100 and the machine learning based controller 130 according to the first to fourth example alterations of the first example embodiment correspond to the control apparatus 400 and the machine learning based controller 430 according to the first to fourth example alterations of the second example embodiment, respectively.

In the following, fifth to eighth example alterations of the second example embodiment will be described.

Note that two or more example alterations of the first to eighth example alterations of the second example embodiment may be combined.

(1) Fifth Example Alteration

As described above, for selection of the controller, the information (specifically, the state information) related to the state of the communication network 10 is used, and for example, the state information indicates the state of the communication network 10 (for example, whether the communication network 10 is congested over the certain level). However, the state information according to the second example embodiment is not limited to the example described above.

In the fifth example alteration of the second example embodiment, the state information need not indicate the state itself of the communication network 10 (for example, whether the communication network 10 is congested over the certain level). For example, the state information may be information corresponding to the state of the communication network 10, although not indicating the state itself of the communication network 10.

As an example, the state information may be a flag corresponding to whether the communication network 10 is congested over the certain level, without indicating whether the communication network 10 is congested over the certain level.

(2) Sixth Example Alteration

As described above, the machine learning based controller 430 is trained based on the work-related information.

In the sixth example alteration of the second example embodiment, in addition to the machine learning based controller 430, the reinforcement learning based controller 440 may also be trained based on the work-related information. For example, the reinforcement learning based controller 440 may be trained based on the work-related information, as in the case with the training described in the fifth example alteration of the first example embodiment.

Training the reinforcement learning based controller 440 by using the work-related information related to the human work as described above can cause reinforcement learning to proceed in advance. Thus, learning in the reinforcement learning based controller 440 can converge without requiring a long period of time after starting to use the reinforcement learning based controller 440 for control of communication in the communication network 10. Therefore, control of communication in the communication network 10 can be further stabilized.

(3) Seventh Example Alteration

The seventh example alteration will be described with reference to FIG. 9 to FIG. 12 again. In the description of the seventh example alteration, the "control apparatus 100" is replaced with the "control apparatus 400" in those figures.

As described above, for example, the control apparatus 400 is a network device (for example, a proxy server, a gateway, a router, a switch, and/or the like) that transfers data in the communication network 10 (see FIG. 9). As described above, for example, when the selected controller (the machine learning based controller 430 or the reinforcement learning based controller 440) selects a change of the network control parameter, the control apparatus 400 (configuring means 442) configures the changed network control parameter in the control apparatus 400 (see FIG. 9). However, the control apparatus 400 according to the second example embodiment is not limited to the example described above.

First Example

In the seventh example alteration of the second example embodiment, as a first example, as illustrated in FIG. 10, the control apparatus 400 may be an apparatus (for example, a network controller) that controls a network device 30 that transfers data in the communication network 10, instead of a network device itself that transfers data in the communication network 10.

The network device 30 may observe the communication network 10, without the control apparatus 400 (observing means 450) itself observing the communication network 10. The control apparatus 400 (observing means 450) may obtain observation information regarding the communication network 10 from the network device 30.

The selected controller (the machine learning based controller 430 or the reinforcement learning based controller 440) may select a change of the network control parameter (for example, priority and/or a band) configured in the network device 30 from the network state (for example, throughput and/or a packet arrival interval) observed in the network device 30, and output the change.

As illustrated in FIG. 10, when the selected controller selects a change of the network control parameter, the control apparatus 400 (configuring means 442) may cause the network device 30 to configure the changed network control parameter. As an example, the control apparatus 400 (configuring means 442) may transmit the parameter information (for example, a command for instructing a change of the network control parameter) indicating a change of the network control parameter to the network device 30, and the network device 30 may configure the changed network control parameter, based on the parameter information. As a result, the network device 30 may transfer data (for example, packets) according to the changed network control parameter.

Second Example

As the second example, as illustrated in FIG. 11, the network controller 50 may control the network device 40 that transfers data in the communication network 10, and the control apparatus 400 may be an apparatus that controls or assists the network controller 50.

The network device 40 may observe the network state, without the control apparatus 400 itself observing the network state of the communication network 10. The control apparatus 400 may obtain information indicating the network state from the network device 40 or the network controller 50. The selected controller (the machine learning based controller 430 or the reinforcement learning based controller 440) may select a change of the network control parameter (for example, priority and/or a band) configured in the network device 40 from the network state (for example, throughput and/or a packet arrival interval) observed in the network device 40, and output the change.

As illustrated in FIG. 11, when the selected controller (the machine learning based controller 430 or the reinforcement learning based controller 440) selects a change of the network control parameter, the control apparatus 400 (configuring means 442) may transmit first parameter information (for example, a command for instructing a change of the network control parameter or assist information reporting a change of the network control parameter) indicating a change of the network control parameter to the network controller 50. In addition, the network controller 50 may transmit second parameter information (for example, a network command for instructing a change of the control parameter) indicating a change of the network control parameter to the network device 40 based on the first parameter information, and the network device 40 may configure the changed network control parameter, based on the second parameter information. As a result, the network device 40 may transfer data (for example, packets) according to the changed network control parameter.

Third Example

As the third example, as illustrated in FIG. 12, the network controller 70 may control the network device 60 that transfers data in the communication network 10, and the control apparatus 400 may be an apparatus that controls the network controller 70.

The network device 60 may observe the network state, without the control apparatus 400 itself observing the network state of the communication network 10. The control apparatus 400 may obtain information indicating the network state from the network device 60 or the network controller 70. The selected controller (the machine learning based controller 430 or the reinforcement learning based controller 440) may select a change of the network control parameter configured in the network controller 70 from the network state observed in the network device 60, and output the change.

As illustrated in FIG. 12, when the selected controller selects a change of the network control parameter, the control apparatus 400 (configuring means 442) may cause the network controller 70 to configure the changed network control parameter. As an example, the control apparatus 400 (configuring means 442) may transmit parameter information (for example, a command for instructing a change of the network control parameter) indicating a change of the network control parameter to the network controller 70, and the network controller 70 may configure the changed network control parameter, based on the parameter information. As a result, the network controller 70 may control the network device 60 according to the changed network control parameter, and the network device 60 may transfer data (for example, packets) according to control by the network controller 70.

(4) Eighth Example Alteration

As described above, for example, the control apparatus 400 includes the first obtaining means 410, the training means 420, the machine learning based controller 430, the reinforcement learning based controller 440, the configuring means 442, the communication processing means 444, the observing means 450, the determining means 460, the second obtaining means 470, and the selecting means 480. However, the control apparatus 400 according to the second example embodiment is not limited to the example described above.

In the eighth example alteration of the second example embodiment, for example, the first obtaining means 410 and the training means 420 may be included in another apparatus, instead of being included in the control apparatus 400. In other words, training of the machine learning based controller 430 may be performed in such another apparatus.

In the eighth example alteration of the second example embodiment, for example, the observing means 450 may be included in another apparatus instead of being included in the control apparatus 400. In this case, the control apparatus 400 may receive observation information regarding the communication network 10 from such another apparatus. In addition, for example, the determining means 460 may also be included in such another apparatus instead of being included in the control apparatus 400. In this case, the control apparatus 400 may receive information (specifically, the state information) related to the state of the communication network 10 from such another apparatus.

In the eighth example alteration of the second example embodiment, for example, at least one of the machine learning based controller 430 and the reinforcement learning based controller 440 may be included in another apparatus instead of being included in the control apparatus 400. In this case, the control apparatus 400 may notify such another apparatus of results of selection of the controller. The configuring means 442 may also be included in such another apparatus instead of being included in the control apparatus 400. Note that, when at least one of the machine learning based controller 430 and the reinforcement learning based controller 440 is not included in the control apparatus 400, in the description of the sixth example alteration, the "control apparatus 400" may be replaced with an "apparatus including at least one of the machine learning based controller 430 and the reinforcement learning based controller 440".

In the eighth example alteration of the third example embodiment, for example, the configuring means 442 may be included in each of the machine learning based controller 430 and the reinforcement learning based controller 440. In other words, each of the machine learning based controller 430 and the reinforcement learning based controller 440 may perform operation of the configuring means 442 described above.

In the eighth example alteration of the second example embodiment, for example, the communication processing means 444 that transfers data (for example, packets) may be included in another apparatus instead of being included in the control apparatus 400. For example, in a case as in the seventh example alteration, the communication processing means 444 may be included in a network device instead of being included in the control apparatus 400.

4. Third Example Embodiment

Next, with reference to FIG. 17 and FIG. 18, a third example embodiment of the present disclosure will be described. The first example embodiment described above is a concrete example embodiment, whereas the third example embodiment is a more generalized example embodiment.

Figure 17:
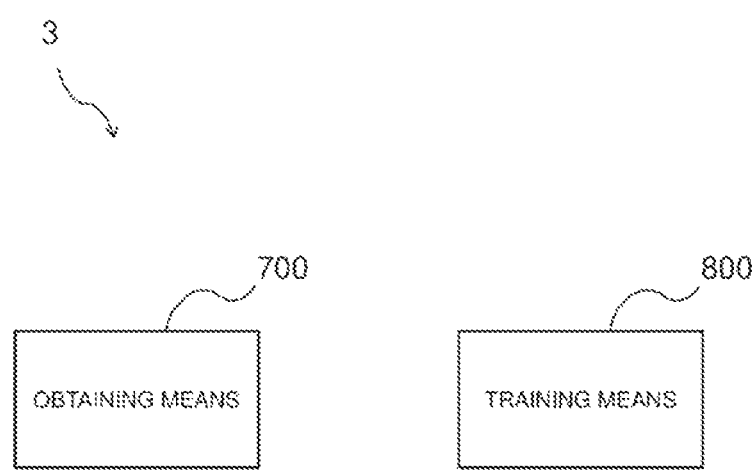
FIG. 17 illustrates an example of a schematic configuration of a system according to a third example embodiment.

FIG. 17 illustrates an example of a schematic configuration of a system 3 according to the third example embodiment. With reference to FIG. 17, the system 3 includes an obtaining means 700 and a training means 800.

Figure 18:
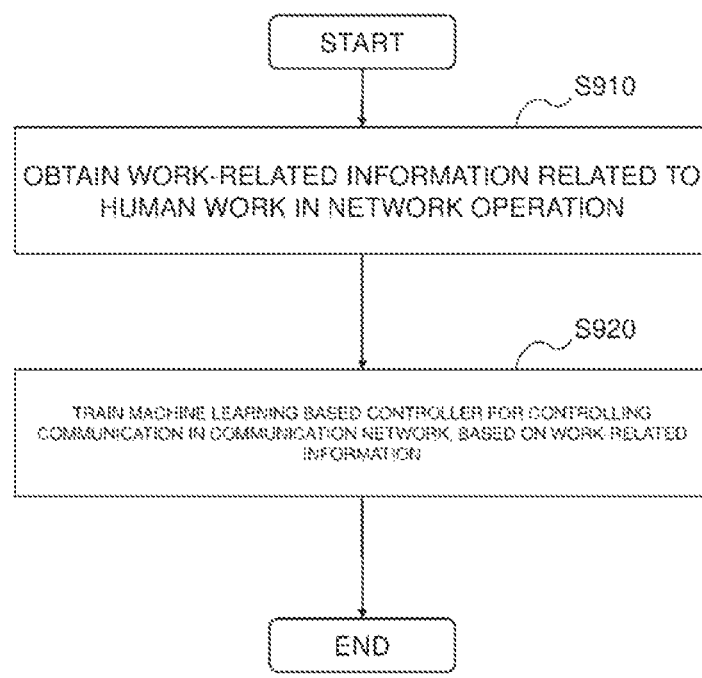
FIG. 18 is a flowchart for illustrating an example of a general flow of training processing according to the third example embodiment.

FIG. 18 is a flowchart for illustrating an example of a general flow of training processing according to the third example embodiment.

The obtaining means 700 obtains work-related information related to human work in network operation (S910).

The training means 800 trains the machine learning based controller for controlling communication in the communication network, based on the work-related information (S920).

Description regarding the work-related information, obtaining of the work-related information, and training are, for example, the same as the description regarding those of the first example embodiment except for differences of the reference signs. Thus, overlapping description will be omitted here. Note that, as a matter of course, the third example embodiment is not limited to the example of the first example embodiment.

As described above, the machine learning based controller is trained. In this manner, for example, control of communication in the communication network can be stabilized.

Descriptions have been given above of the example embodiments of the present disclosure. However, the present disclosure is not limited to these example embodiments. It should be understood by those of ordinary skill in the art that these example embodiments are merely examples and that various alterations are possible without departing from the scope and the spirit of the present disclosure.

For example, the steps in the processing described in the Specification may not necessarily be executed in time series in the order described in the flowcharts. For example, the steps in the processing may be executed in order different from that described in the flowcharts or may be executed in parallel. Some of the steps in the processing may be deleted, or more steps may be added to the processing.

Moreover, a method including processing of the constituent elements of the system or the control apparatus described in the Specification may be provided, and programs for causing a processor to execute the processing of the constituent elements may be provided. Moreover, a non-transitory computer readable recording medium (non-transitory computer readable recording media) having recorded thereon the programs may be provided. It is apparent that such methods, programs, and non-transitory computer readable recording media are also included in the present disclosure.

The whole or part of the example embodiments disclosed above can be described as, but not limited to, the following supplementary notes.

(Supplementary Note 1)

A system comprising:
- an obtaining means for obtaining work-related information related to human work in network operation; and
- a training means for training a machine learning based controller for controlling communication in a communication network, based on the work-related information.

(Supplementary Note 2)

The system according to supplementary note 1, wherein the work-related information includes work information indicating the human work and network state information indicating a network state corresponding to the human work.

(Supplementary Note 3)

The system according to supplementary note 2, wherein the training means trains the machine learning based controller by using the network state information as input data and using the work information as output data corresponding to the input data.

(Supplementary Note 4)

The system according to supplementary note 2 or 3, wherein
- the human work is a change of a network control parameter, and
- the work information indicates increase or decrease of the network control parameter or a changed value of the network control parameter.

(Supplementary Note 5)

The system according to any one of supplementary notes 1 to 4, wherein the human work is a change of the network control parameter.

(Supplementary Note 6)

The system according to any one of supplementary notes 1 to 5, wherein the work-related information is information generated based on a log of the human work or a work standard for the human work.

(Supplementary Note 7)

The system according to any one of supplementary notes 1 to 6, wherein the network operation is network operation of the communication network.

(Supplementary Note 8)

The system according to any one of supplementary notes 1 to 7, further comprising a selecting means for selecting one, of a reinforcement learning based controller configured to control communication in the communication network and the machine learning based controller, based on information related to a state of the communication network.

(Supplementary Note 9)

The system according to supplementary note 8, wherein the state of the communication network is a congestion state of the communication network.

(Supplementary Note 10)

The system according to supplementary note 9, wherein the selecting means selects the machine learning based controller when the communication network is congested over a certain level, and the selecting means selects the reinforcement learning based controller when the communication network is not congested over the certain level.

(Supplementary Note 11)

The system according to any one of supplementary notes 8 to 10, further comprising a determining means for determining the state of the communication network.

(Supplementary Note 12)

The system according to supplementary note 11, wherein the determining means determines the state of the communication network, based on observation information regarding the communication network.

(Supplementary Note 13)

The system according to supplementary note 11 or 12, wherein the determining means determines whether the communication network is congested over the certain level.

(Supplementary Note 14)

The system according to any one of supplementary notes 1 to 13, wherein
- the machine learning based controller is a supervised learning based controller, and
- the training means trains the machine learning based controller by using the work-related information as training data of supervised learning.

(Supplementary Note 15)

The system according to any one of supplementary notes 1 to 7, wherein
- the machine learning based controller is a reinforcement learning based controller configured to output an action, based on an input state, and
- the training means trains the machine learning based controller, considering the work-related information as the input state and an output action in reinforcement learning.

(Supplementary Note 16)

A method comprising:
- obtaining work-related information related to human work in network operation; and
- training a machine learning based controller for controlling communication in a communication network, based on the work-related information.

(Supplementary Note 17)

The method according to supplementary note 16, wherein the work-related information includes work information indicating the human work and network state information indicating a network state corresponding to the human work.

(Supplementary Note 18)

The method according to supplementary note 17, wherein the machine learning based controller is trained by using the network state information as input data and using the work information as output data corresponding to the input data.

(Supplementary Note 19)

The method according to supplementary note 17 or 18, wherein
- the human work is a change of a network control parameter, and
- the work information indicates increase or decrease of the network control parameter or a changed value of the network control parameter.

(Supplementary Note 20)

The method according to any one of supplementary notes 16 to 19, wherein the human work is a change of the network control parameter.

(Supplementary Note 21)

The method according to any one of supplementary notes 16 to 20, wherein the work-related information is information generated based on a log of the human work or a work standard for the human work.

(Supplementary Note 22)

The method according to any one of supplementary notes 16 to 21, wherein the network operation is network operation of the communication network.

(Supplementary Note 23)

The method according to any one of supplementary notes 16 to 22, further comprising selecting one, of a reinforcement learning based controller configured to control communication in the communication network and the machine learning based controller, based on information related to a state of the communication network.

(Supplementary Note 24)

The method according to supplementary note 23, wherein the state of the communication network is a congestion state of the communication network.

(Supplementary Note 25)

The method according to supplementary note 24, wherein the machine learning based controller is selected when the communication network is congested over a certain level, and the reinforcement learning based controller is selected when the communication network is not congested over the certain level.

(Supplementary Note 26)

The method according to any one of supplementary notes 23 to 25, further comprising:

determining the state of the communication network.

(Supplementary Note 27)

The method according to supplementary note 26, wherein the state of the communication network is determined based on observation information regarding the communication network.

(Supplementary Note 28)

The method according to supplementary note 26 or 27, wherein the state of the communication network is whether the communication network is congested over the certain level.

(Supplementary Note 29)

The method according to any one of supplementary notes 16 to 28, wherein
  the machine learning based controller is a supervised learning based controller, and
  the machine learning based controller is trained by using the work-related information as training data of supervised learning.

(Supplementary Note 30)

The method according to any one of supplementary notes 16 to 22, wherein
  the machine learning based controller is a reinforcement learning based controller configured to output an action, based on an input state, and
  the machine learning based controller is trained, considering the work-related information as the input state and an output action in reinforcement learning.

(Supplementary Note 31)

A control apparatus comprising:
  obtaining means for obtaining work-related information related to human work in network operation; and
  training means for training a machine learning based controller for controlling communication in a communication network, based on the work-related information.

(Supplementary Note 32)

The control apparatus according to supplementary note 31, wherein the work-related information includes work information indicating the human work and network state information indicating a network state corresponding to the human work.

(Supplementary Note 33)

The control apparatus according to supplementary note 32, wherein the training means trains the machine learning based controller by using the network state information as input data and using the work information as output data corresponding to the input data.

(Supplementary Note 34)

The control apparatus according to supplementary note 32 or 33, wherein the human work is a change of a network control parameter, and
  the work information indicates increase or decrease of the network control parameter or a changed value of the network control parameter.

(Supplementary Note 35)

The control apparatus according to any one of supplementary notes 31 to 34, wherein the human work is a change of the network control parameter.

(Supplementary Note 36)

The control apparatus according to any one of supplementary notes 31 to 35, wherein the work-related information is information generated based on a log of the human work or a work standard for the human work.

(Supplementary Note 37)

The control apparatus according to any one of supplementary notes 31 to 36, wherein the network operation is network operation of the communication network.

(Supplementary Note 38)

The control apparatus according to any one of supplementary notes 31 to 37, further comprising a selecting means for selecting one, of a reinforcement learning based controller configured to control communication in the communication network and the machine learning based controller, based on information related to a state of the communication network.

(Supplementary Note 39)

The control apparatus according to supplementary note 38, wherein the state of the communication network is a congestion state of the communication network.

(Supplementary Note 40)

The control apparatus according to supplementary note 39, wherein the selecting means selects the machine learning based controller when the communication network is congested over a certain level, and the selecting means selects the reinforcement learning based controller when the communication network is not congested over the certain level.

(Supplementary Note 41)

The control apparatus according to any one of supplementary notes 38 to 40, further comprising:

determining means for determining the state of the communication network.

(Supplementary Note 42)

The control apparatus according to supplementary note 41, wherein the determining means determines the state of the communication network, based on observation information regarding the communication network.

(Supplementary Note 43)

The control apparatus according to supplementary note 41 or 42, wherein the determining means determines whether the communication network is congested over the certain level.

(Supplementary Note 44)

The control apparatus according to any one of supplementary notes 31 to 43, wherein
  the machine learning based controller is a supervised learning based controller, and
  the training means trains the machine learning based controller by using the work-related information as training data of supervised learning.

(Supplementary Note 45)

The control apparatus according to any one of supplementary notes 31 to 37, wherein
  the machine learning based controller is a reinforcement learning based controller configured to output an action, based on an input state, and the training means trains the machine learning based controller, considering the work-related information as the input state and an output action in reinforcement learning.

(Supplementary Note 46)

A program that causes a processor to execute:

obtaining work-related information related to human work in network operation; and training a machine learning based controller for controlling communication in a communication network, based on the work-related information.

(Supplementary Note 47)

A non-transitory computer readable recording medium recording a program that causes a processor to execute:

obtaining work-related information related to human work in network operation; and training a machine learning based controller for controlling communication in a communication network, based on the work-related information.

REFERENCE SIGNS LIST 1, 2, 3 System
10 Communication Network
100, 400 Control Apparatus
110, 700 Obtaining Means
410 First Obtaining Means
120, 420, 900 Training Means
130, 430 Machine Learning Based Controller
440 Reinforcement Learning Based Controller
460 Determining Means
480 Selecting Means

What is claimed is:

1. A system comprising:
one or more apparatuses each including a memory storing instructions and one or more processors configured to execute the instructions, wherein
the one or more apparatuses are configured to:
obtain work-related information related to human work in network operation;
train a machine learning based controller for controlling communication in a communication network, based on the work-related information;
select the machine learning based controller when the communication network is congested over a certain level; and
select a reinforcement learning based controller configured to control communication in the communication network when the communication network is not congested over the certain level, and
the reinforcement learning is learning what kind of action realizes a greatest reward according to a state of the communication network.

2. The system according to claim 1, wherein
the work-related information includes work information indicating the human work and network state information indicating a network state corresponding to the human work.

3. The system according to claim 1, wherein
the state of the communication network is a congestion state of the communication network.

4. The system according to claim 1, wherein
the machine learning based controller is a supervised learning based controller, and
the one or more apparatuses are configured to train the machine learning based controller by using the work-related information as training data of supervised learning.

5. The system according to claim 1, wherein
the reinforcement learning based controller is configured to output an action, based on an input state, and
the one or more apparatuses are configured to train the reinforcement learning based controller, by considering the work-related information as the input state and an output action in the reinforcement learning.

6. A method comprising:
obtaining work-related information related to human work in network operation;
training a machine learning based controller for controlling communication in a communication network, based on the work-related information;
selecting the machine learning based controller when the communication network is congested over a certain level; and
selecting a reinforcement learning based controller configured to control communication in the communication network when the communication network is not congested over the certain level, wherein
the reinforcement learning is learning what kind of action realizes a greatest reward according to a state of the communication network.

7. The method according to claim 6, wherein
the work-related information includes work information indicating the human work and network state information indicating a network state corresponding to the human work.

8. The method according to claim 6, wherein
the state of the communication network is a congestion state of the communication network.

9. The method according to claim 6, wherein
the machine learning based controller is a supervised learning based controller, and
the machine learning based controller is trained by using the work-related information as training data of supervised learning.

10. The method according to claim 6, wherein
the reinforcement learning based controller is configured to output an action, based on an input state, and
the reinforcement learning based controller is trained, by considering the work-related information as the input state and an output action in the reinforcement learning.

11. A control apparatus comprising:
a memory storing instructions; and
one or more processors configured to execute the instructions to:
obtain work-related information related to human work in network operation;
train a machine learning based controller for controlling communication in a communication network, based on the work-related information;
select the machine learning based controller when the communication network is congested over a certain level;
select a reinforcement learning based controller configured to control communication in the communication network when the communication network is not congested over the certain level, wherein
the reinforcement learning is learning what kind of action realizes a greatest reward according to a state of the communication network.

12. The control apparatus according to claim 11, wherein the work-related information includes work information indicating the human work and network state information indicating a network state corresponding to the human work.

13. The control apparatus according to claim 11, wherein the state of the communication network is a congestion state of the communication network.

14. The control apparatus according to claim 11, wherein the machine learning based controller is a supervised learning based controller, and
the one or more processors are configured to execute the instructions to train the machine learning based controller by using the work-related information as training data of supervised learning.

15. The control apparatus according to claim 11, wherein the reinforcement learning based controller is configured to output an action, based on an input state, and
the one or more processors are configured to execute the instructions to train the reinforcement learning based controller, by considering the work-related information as the input state and an output action in the reinforcement learning.

\* \* \* \* \*